(12) United States Patent
Gackstatter

(10) Patent No.: US 6,244,648 B1
(45) Date of Patent: Jun. 12, 2001

(54) CENTER CONSOLE BETWEEN SEATS OF A MOTOR VEHICLE HAVING A CLOSABLE DEPOSITING SPACE

(75) Inventor: Matthias Gackstatter, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/517,295

(22) Filed: Mar. 2, 2000

(30) Foreign Application Priority Data

Mar. 2, 1999 (DE) ............................................. 199 08 909

(51) Int. Cl.[7] ...................................................... B60N 3/00
(52) U.S. Cl. ............................................................ 296/37.8
(58) Field of Search ............................. 296/24.1, 37.14, 296/37.15, 37.8

(56) References Cited

U.S. PATENT DOCUMENTS

| 4,453,759 | * | 6/1984 | Kathiria | 296/37.8 |
| 5,372,403 | * | 12/1994 | Puerto | 297/188 X |
| 6,045,173 | * | 4/2000 | Tiesler et al. | 296/37.8 |

FOREIGN PATENT DOCUMENTS

| 2822378 C2 | 12/1979 | (DE) . |
| 3501714 A1 | 7/1986 | (DE) . |
| 3503967 | * 8/1986 | (DE) ................................... 296/37.8 |
| 3807880 C2 | 9/1989 | (DE) . |
| 196 15 743 C1 | 9/1997 | (DE) . |
| 198 56 979 A1 | 3/2000 | (DE) . |
| 0180339 | * 10/1983 | (JP) ..................................... 296/37.8 |

OTHER PUBLICATIONS

Patent Abstracts of Japan, Publication No. 57158140, "Console Box of Automobiles", by Sato Ken, Nissan Motor Co Ltd., Sep. 1982.
Patent Abstracts of Japan, Publication No. 06107073, "Console Box for Automobile", by Manaka Morio, Suzuki Motor Corp., Apr. 1994.
Patent Abstracts of Japan, Publication No. 09301080, "Vehicular Console Box", by Hirano Hiroyuki, Araco Corp., Nov. 1997.

* cited by examiner

*Primary Examiner*—D. Glenn Dayoan
*Assistant Examiner*—Lori L Coletta
(74) *Attorney, Agent, or Firm*—Evenson, McKeown, Edwards & Lenahan, P.L.L.C.

(57) ABSTRACT

The depositing possibilities of a depositing space of a center console between seats of a motor vehicle are improved by configuring the overall depositing space so that it has a first depositing space and a second depositing space formed by a depositing tray situated within the first depositing space. The depositing tray can be pushed out of the first depositing space in the sliding direction of the lid.

6 Claims, 2 Drawing Sheets

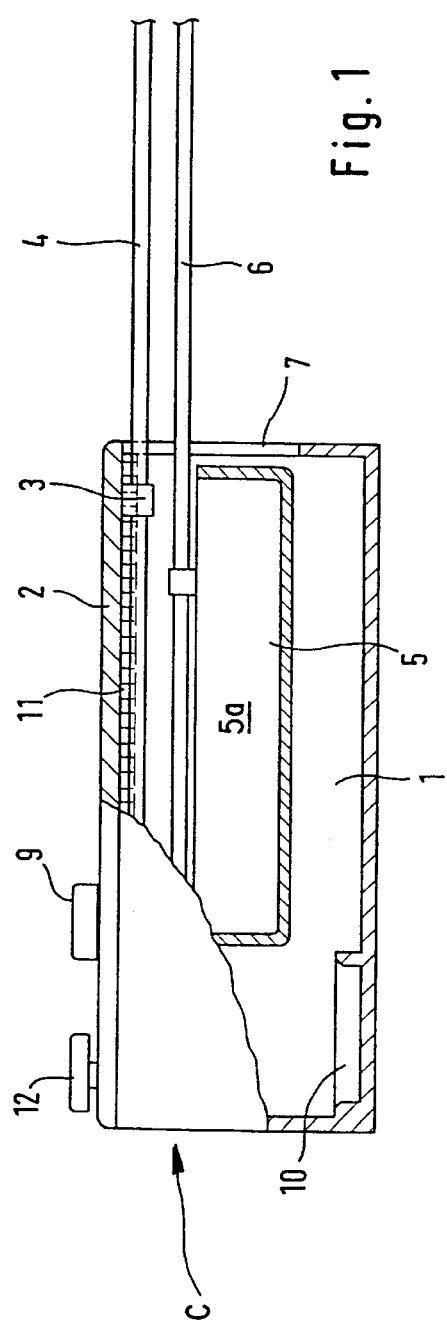
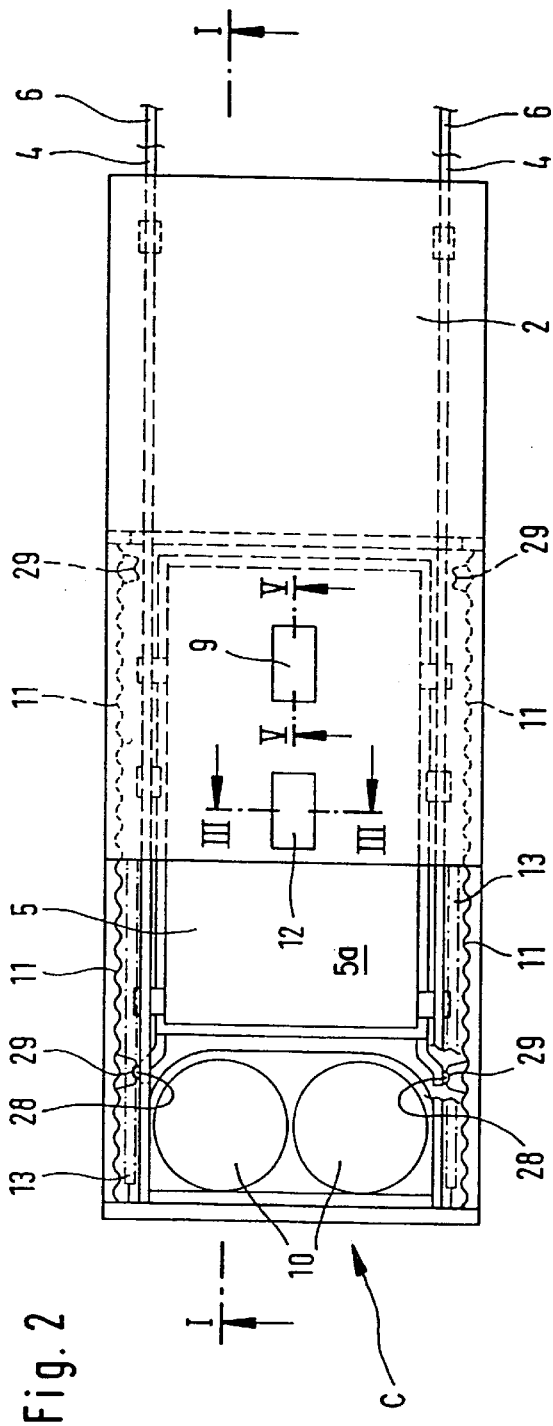

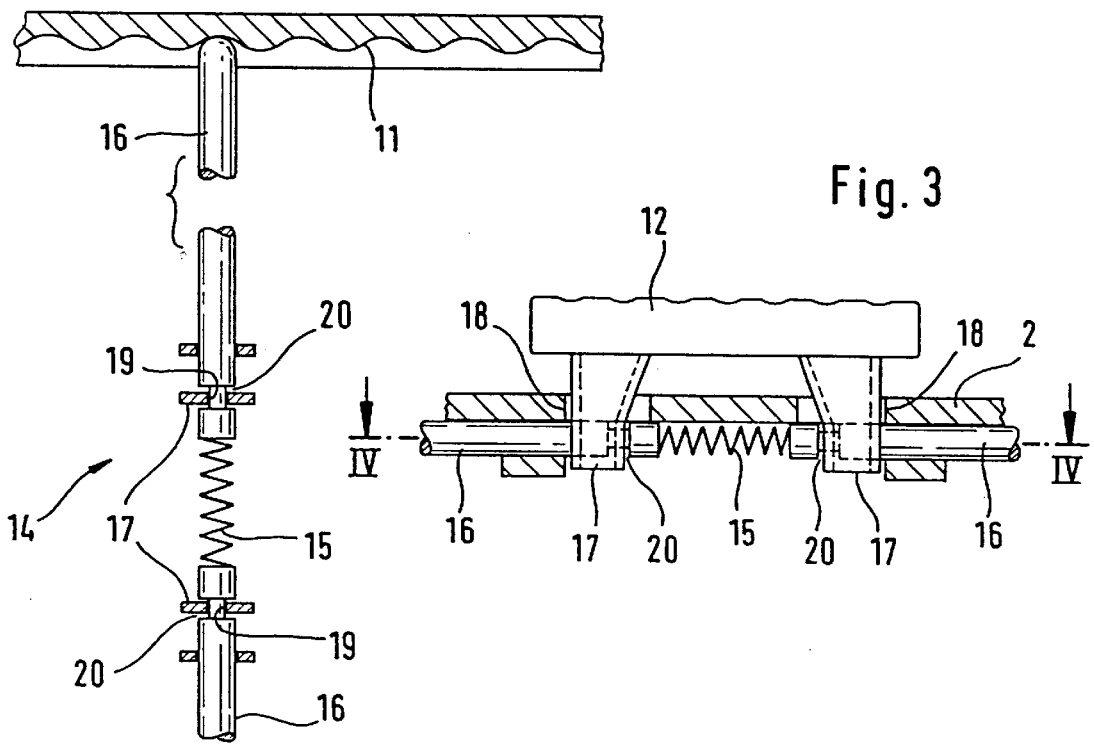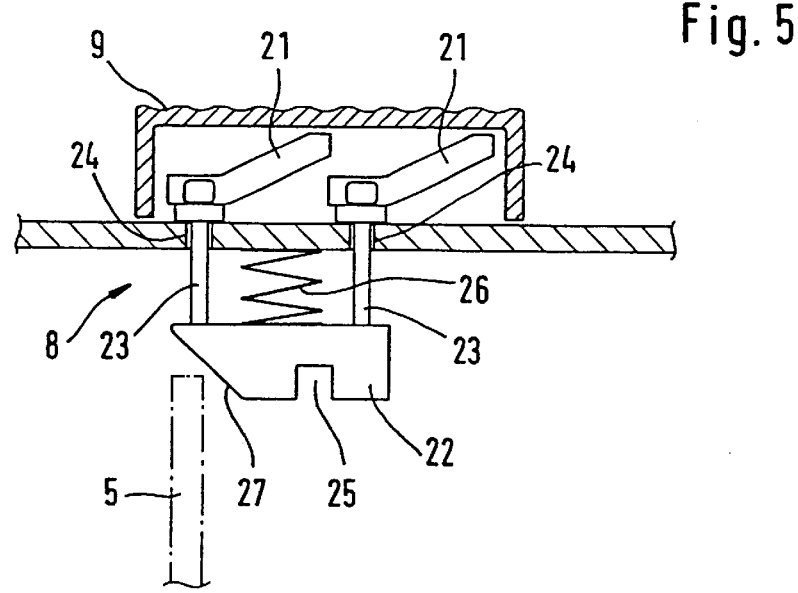

CENTER CONSOLE BETWEEN SEATS OF A MOTOR VEHICLE HAVING A CLOSABLE DEPOSITING SPACE

This application claims the priority of German application 199 08 909.4, filed Mar. 2, 1999, the disclosure of which is expressly incorporated by reference herein.

BACKGROUND AND SUMMARY OF THE INVENTION

The present invention relates to a center console between seats of a motor vehicle having a closable depositing space. The console can be closed at its top by a lid which is displaceable in the longitudinal direction of the console.

Such a center console is known, for example, from German Patent Document DE 28 22 378 C2.

This invention addresses the problem of improving the depositing possibilities in the depositing space of such a center console. According to the invention, a center console of the above-mentioned type has an overall depositing space including a first depositing space and a second depositing space. The second depositing space is formed by a depositing tray situated within the first depositing space. The depositing tray can be pushed out of the first depositing space in a sliding direction of the lid.

Expedient further developments of the invention are also reflected in the claims.

German Patent Document DE 38 07 880 C2 discloses a center console having a first depositing space in which a second depositing space is situated in a removable manner. In this known construction, the lid is folded open toward the side. Folding open is optionally possible either together with the second depositing space or without it. In this construction, the lid, which can be folded open toward the side, is bothersome in the opened condition. In addition, a complicated mechanism is required for folding open the second depositing space together with the lid.

In contrast, the solution according to the invention has the advantage that an opened lid, which is pushed to the rear, does not hinder the persons in the two adjacent seats. In addition, the device according to the invention has the advantage that a forward space of the first depositing space can be kept free of the depositing tray, so that, when a lid is partially opened, this space can be used, for example, for receiving one or several cups. Furthermore, on its upward-facing side, the lid is expediently padded in order to be able to serve as an armrest. In a manner known per se, the lid can also be pushed forward beyond the depositing space in order to be able to obtain an armrest which is pulled toward the front.

One embodiment, which will be described in detail, is illustrated in the drawing figures.

BRIEF DESCRIPTION OF THE DRAWINGS

FIG. 1 is a view of a small corner area and a longitudinal sectional view of the remaining area of a center console having a divisible depositing space as seen along line I—I in FIG. 2;

FIG. 2 is a top view of a center console according to FIG. 1 with a partially opened lid;

FIG. 3 is a sectional view along line III—III in FIG. 2 as a cutout;

FIG. 4 is a sectional view along line IV—IV in FIG. 3; and

FIG. 5 is a sectional view along line V—V in FIG. 2 as a cutout.

DETAILED DESCRIPTION OF THE DRAWINGS

According to the displacement position of a lid 2, a first depositing space 1 of a center console C between the front seats of a motor vehicle is opened or closed by the lid 2, which can be displaced to the rear.

By way of sliders 3, the lid 2 can be displaced on rails 4 provided on both side walls of the first depositing space 1. The rails 4 project toward the rear out of the first depositing space. outside of the depositing space, the rails may be integrated in vehicle-side components, so that they cannot be perceived in a visually disturbing manner.

In the first depositing space 1, a depositing tray 5 is situated as a second depositing space 5a above the bottom of the first depositing space. This depositing tray 5 is also disposed on rails 6 in a longitudinally slidable manner on the side walls of the first depositing space 1. Between the lid 2 and the depositing tray 5, different mutual relative positions are conceivable by mutual locking. Optionally, it is possible to lock the depositing tray 5 with the lid 2 or to adjust a condition in which the lid 2 and the depositing tray 5 can be moved with respect to one another. Depending on which of the two possibilities is used, the lid 2 can be displaced either alone or together with the depositing tray 5. For displacement out of the depositing space 1 toward the rear, the rear wall of the depositing space 1 has an opening 7 which is adapted to the cross-sectional surface of the depositing tray 5.

If, when the interior of the center console is opened by the displacement of the lid 2, access to the depositing tray 5 is desired, the lid 2 is pushed toward the rear in a condition which is unlocked with respect to the depositing tray 5.

Activation and deactivation of locking between the lid 2 and the depositing tray 5 takes place by way of actuating devices 8 which can be operated by way of a key button 9.

Such actuating devices are illustrated in FIG. 5. Their construction and function are as follows.

The key button 9 is a slide which is disposed on the lid 2 in its displacement direction. In the key button 9, a closing part 22 is disposed in guiding grooves 21 and reaches by way of webs 23 through openings 24 of the lid. The webs 23 are guided in the openings 24. The ends of the webs 23 facing away from the closing part 22 are displaceably disposed in the guiding grooves 21. The guiding grooves 21 have a course by which, when the key button 9 is displaced, the closing part 22 is moved in a direction extending perpendicularly to the plane of the lid 2, so that the closing part 22 can be displaced between a closing position and an opening position. In the closing position of the closing part 22, the depositing tray 5 can be locked by way of, for example, one of its edge areas in a locking groove 25 provided on the closing part 22. A pressure spring 26 provided between the closing part 22 and the lid 2 causes an inoperative position of the key button 9, in which this key button 9 performs the locking function.

During closing of the lid 2, in order to be able to achieve automatic locking between the lid 2 and the depositing tray 5 without any active operation of the key button 9, the closing part 22 is provided with a ramp 27 by way of which the closing part 22 can be brought into a mutually locked condition with the depositing tray 5.

During locking between the lid 2 and the depositing tray 5 caused by the key button 9, when the lid 2 is opened up, by displacement toward the rear, the depositing tray 5 is pushed out of the first depositing space 1. As a result, the area of the first depositing space 1 is accessible. When the depositing tray 5 is pushed in, this area is situated below it.

The length of the depositing tray 5 can be selected such that a clearance remains in the forward area of the depositing space 1. When the lid 2 is partially opened, this clearance can be used, for example, as a receiving space for cups. For this purpose, corresponding recesses 10 may be provided in the forward bottom area of the first receiving space 1.

The lid 2 can be locked in various opening positions on the side walls of the first receiving space. For this purpose, detent receiving devices 11 are provided on the side walls. Locking can be constructed such that it can be eliminated by a forceful displacement of the lid 2. However, for releasing the lid from the locked positions, a special release mechanism may be required which can be operated by way of a key button 12 on the lid 2.

In the release mechanism illustrated in FIG. 3, a key button 12 disposed in the lid 2 operates a locking device 14 interacting with the detent receiving devices 11. This locking device 14 has two detent rods 16 which, aligned with one another, are displaceable transversely to the sliding direction of the lid 2 disposed on the lid and are tensioned with respect to one another by a pressure spring 15. These detent rods 16 are pressed by the pressure spring 15 tensioned between them, with their ends facing away from the pressure spring 15, into the detent receiving devices 11 and thereby cause locking between the lid 2 and the two side walls of the first depositing space 1. By way of two webs 17 molded to these side walls, the key button 12 reaches through receiving openings 18 of the lid 2. Each of the webs 17 is provided with a guiding groove 19 which is open toward the free web end and in which the respectively spring-loaded ends of the detent rods 16 engage by way of assigned receiving grooves 20. The webs 17 are molded to the key button 12 such that, when the key button 12 is moved perpendicularly to the plane of the lid 2, a longitudinal displacement of the detent rods 16 takes place in the opposite direction by the interaction of the guiding and receiving grooves 19 and 20. In this case, the pressure spring 19 causes an inoperative position of the key button 12, during which locking exists. If the key button 12 is operated by pressing in the direction of the lid 2, locking is eliminated.

The depositing tray 5 has snap-in tongues 28 (FIG. 2), by way of which it can be locked in at least two assignment positions with respect to the first depositing space 1, specifically a fully pushed-in position and a fully pushed-out position. In the locked positions, the snap-in tongues 28 are applied to complementary detent receiving devices 29 on the side walls of the first depositing space 1.

So that the opened lid 2 can arrive from its opening position automatically in its closing position, it is connected by way of tension springs 13 with the forward front wall of the first depositing space. These tension springs 13 are tensioned when the lid 2 is opened. In order to avoid unintentional closing of the lid 2, the lid 2 must in each case be locked in its opening positions. These locked conditions can be eliminated by the release mechanism, which can be operated by the key button 12. Naturally, it is also conceivable to mount an operating key for this release mechanism in the forward area of the center console in order to obtain particularly favorable operability.

In order to serve as an armrest, the lid 2 is padded on its top side. The lid 2 can also be displaceable to the front beyond the depositing space in order to offer a particularly comfortable arm rest in this position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Center console between seats of a motor vehicle and forming a first depositing space which can be closed at its top by a lid displaceable in the longitudinal direction of the console,
   wherein a second depositing space is formed by a depositing tray situated within the first depositing space,
   wherein the depositing tray can be pushed out of the first depositing space in the sliding direction of the lid, and
   wherein, in an opened condition, the lid is acted upon by spring force in the closing direction and can be locked in different open positions.

2. Center console according to claim 1, wherein the depositing tray can be situated exclusively outside a forward area of the first depositing space.

3. Center console between seats of a motor vehicle and forming a first depositing space which can be closed at its top by a lid displaceable in the longitudinal direction of the console,
   wherein a second depositing space is formed by a depositing tray situated within the first depositing space,
   wherein the depositing tray can be pushed out of the first depositing space in the sliding direction of the lid,
   wherein the lid can temporarily be coupled to the depositing tray so as to be taken along with the depositing tray, and
   wherein, in an opened condition, the lid is acted upon by spring force in the closing direction and can be locked in different open positions.

4. Center console between seats of a motor vehicle and forming a first depositing space comprising:
   a lid, displaceable with respect to the console, which can close the first depositing space, and
   a displaceable tray having a second depositing space formed thereby situated within the first depositing space,
   wherein the depositing tray can be pushed out of the first depositing space in a sliding direction of the lid, and
   wherein, in an opened condition, the lid is acted upon by spring force in the closing direction and can be locked in different open positions.

5. Center console according to claim 4, wherein the depositing tray can be situated exclusively outside a forward area of the first depositing space.

6. Center console between seats of a motor vehicle and forming a first depositing space comprising:
   a lid, displaceable with respect to the console, which can close the first depositing space, and
   a displaceable tray having a second depositing space formed thereby situated within the first depositing space,
   wherein the depositing tray can be pushed out of the first depositing space in a sliding direction of the lid,
   wherein the lid can temporarily be coupled to the depositing tray so as to be taken along with the depositing tray, and
   wherein, in an opened condition, the lid is acted upon by spring force in the closing direction and can be locked in different open positions.

* * * * *